(No Model.) 3 Sheets—Sheet 1.
G. M. HOADLEY & S. A. BEMIS.
RAILWAY CAR.
No. 477,935. Patented June 28, 1892.
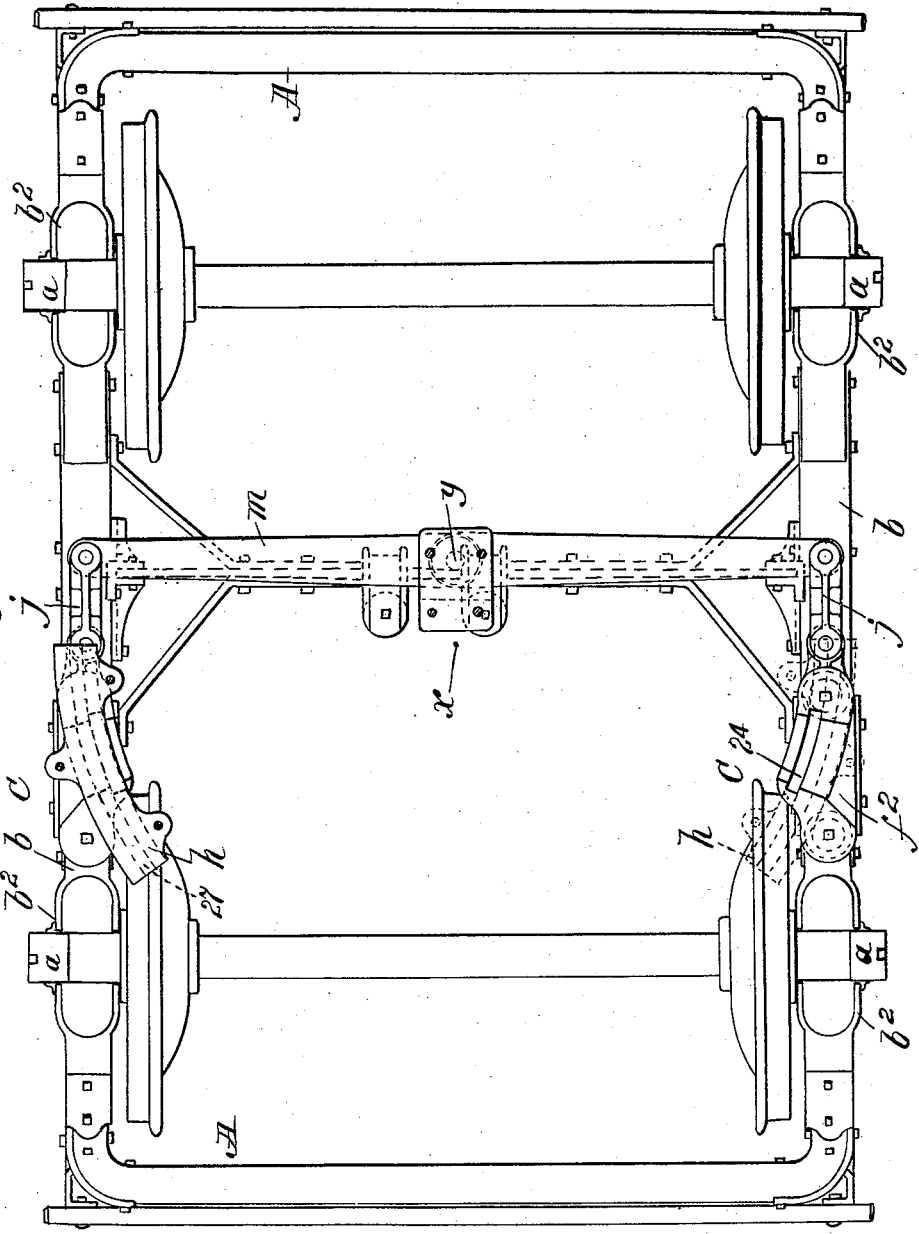

(No Model.) 3 Sheets—Sheet 2.
G. M. HOADLEY & S. A. BEMIS.
RAILWAY CAR.
No. 477,935. Patented June 28, 1892.
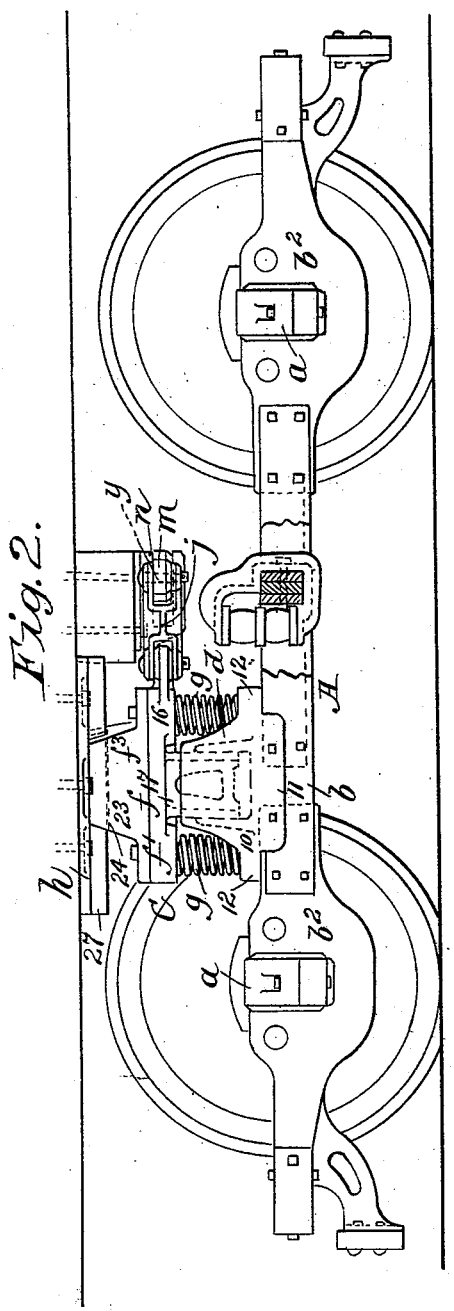
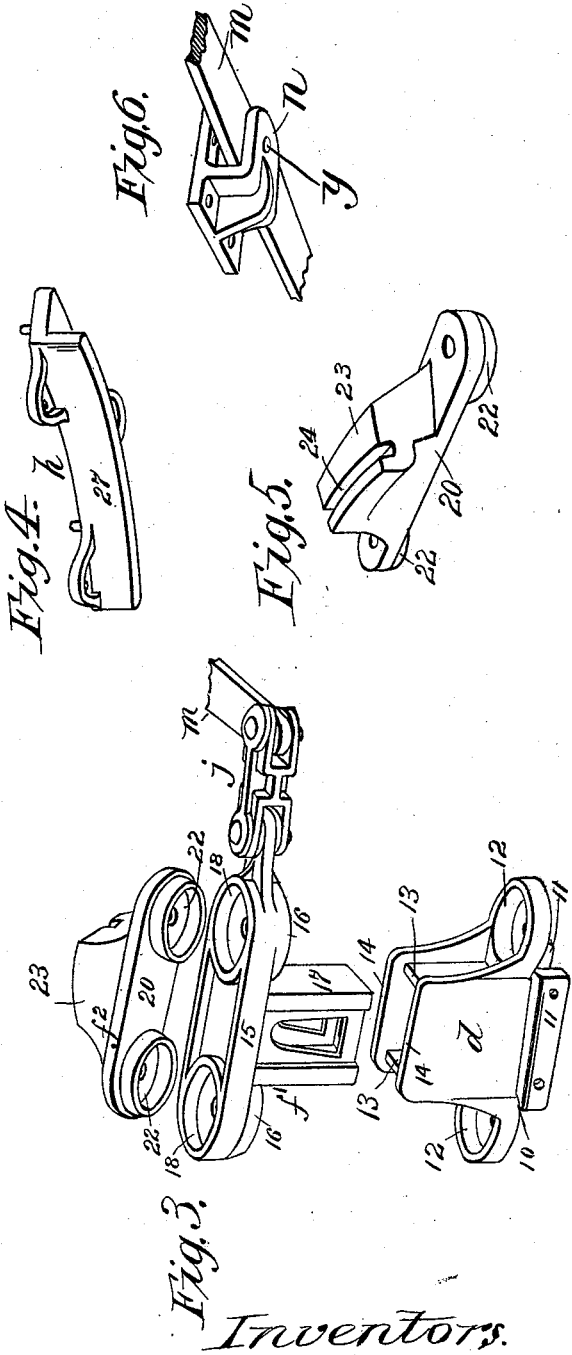
Witnesses
J. W. Garfield
T. F. Deneen
Inventors.
Geo. M. Hoadley
Sumner A. Bemis,
per Chapin & Co.
attys.

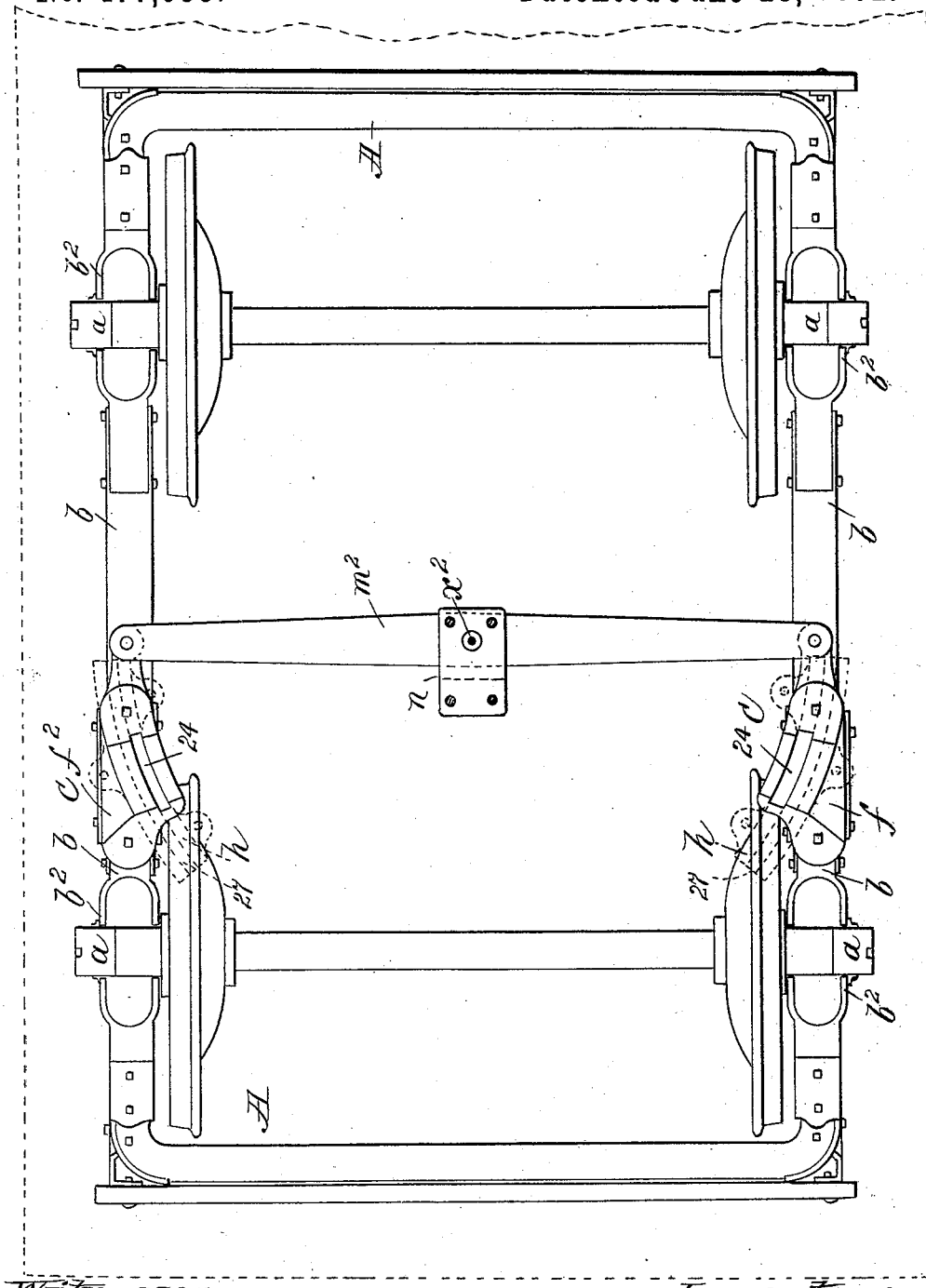

UNITED STATES PATENT OFFICE.

GEORGE M. HOADLEY AND SUMNER A. BEMIS, OF SPRINGFIELD, MASSACHUSETTS.

RAILWAY-CAR.

SPECIFICATION forming part of Letters Patent No. 477,935, dated June 28, 1892.

Application filed March 16, 1892. Serial No. 425,197. (No model.)

*To all whom it may concern:*

Be it known that we, GEORGE M. HOADLEY and SUMNER A. BEMIS, citizens of the United States, both residing at Springfield, in the county of Hampden and State of Massachusetts, have invented new and useful Improvements in Railway-Cars, of which the following is a specification.

This invention relates to improvements in railway-cars, especially double-truck electric cars, the invention more particularly appertaining to the construction of the truck and the mounting and connection of the car-body thereon and therewith.

An object of the invention is to provide by improved means in the truck capabilities for the mounting of the body whereby the weight of the body which each of the trucks supports is sustained at each side of the framing of the truck and nearer to one set of wheels than the other, so that the tractional advantages arising by such disposition of the load will be assured.

Another object of the invention is to so mount the car-body that while the weight thereof is supported substantially at lateral portions of the truck nearer the one car-wheel than the other, whereby the car-body will have sliding engagements with the truck-supports therefor and be capable of substantially a swiveling motion relative to the truck upon or about a point which is substantially midway of the forward and rearward axles, (so that consequently in rounding curves the forward and rearward wheels will swing equally laterally relative to the median longitudinal line of the car-body.) The space within the truck between the axles, which comprises the said center of swiveling movement of the truck relative to the car-body, may not be occupied by any part of the truck structure. This latter capability, which may be availed of as circumstances require, permits of sufficient space between one of the axles and the motor-support for the disposition therein of the electric motor.

The invention consists in the combination or arrangement of parts or devices and, also, in the form and construction of certain of the parts, all substantially as will hereinafter fully appear, and be set forth in the claims.

Reference is to be had to the accompanying drawings, in which—

Figure 1 is a plan view of one truck, two of which are understood as being required under the forward and rearward extremities of the car-body for the support thereof. In said plan view at the upper portion thereof there is indicated by full lines a curved device, which is understood as being an appliance of the car-body, another of said appliances being indicated by dotted lines at the lower part of said view. Fig. 2 is a side elevation of the parts shown or indicated in Fig. 1. Fig. 3 is a view in perspective representing parts which constitute or are intimately related to one of the bolsters, of which for each truck there are two. Fig. 4 is a perspective view of one of the attachments for the car-body, which has a sliding engagement with the bolster. Fig. 5 is a view in perspective of the same member which constitutes a part of the bolster, as is seen at the upper part of Fig. 3, the same, however, being seen from the other side thereof. Fig. 6 is a detail. Fig. 7 is a plan view of the truck.

In the drawings the truck is shown as comprising forward and rearward pairs of axle-united car-wheels on the journals $a$ $a$ for which the yoke or truck frame A is supported, and the said truck-frame, preferably and substantially as shown in Fig. 2, is supported in a horizontal plane about on a level with the car-wheel axles. The specific character of the truck-frame requires no specific mention, the one shown being merely an example of a desirable form of truck-frame, and comprises opposing and parallel longitudinally-ranging side beams $b$ $b$, which extend between and unite the yokes or saddles $b^2$ $b^2$, that are understood as having supporting engagements with the journals. The truck-frame also embodies cross uniting-beams.

The reference-letter C generally indicates the bolster, one of which is provided at each side of the truck-frame nearer one of the pair of car-wheels than the other, said bolsters being supported by the said side truck-frame beams $b$ $b$. Each bolster comprises a casting $d$ (see Fig. 2 and the lower section of Fig. 3) and the two-part casting $f$, which is also shown in Fig. 2 and at the upper part of Fig.

3, the parts of this latter bolster member being shown as separated the one from the other, and the part $f$, as a whole, is spring-supported by and above the part $d$, being, by the engagement which it has with the latter, constrained against any lateral or twisting movements. The casting $d$ is understood as being a bushing or fitting for the yoke-beam, and consists of a base 10, having parallel separated pending ear-pieces 11 11, which overlie the opposite sides of the brake-beam $b$, being bolted thereto, and the upwardly-opening cup members or sockets 12 12. The said appliance further comprises the parallel vertical longitudinally-ranging and separated cheek-pieces 14 14, having the separated transverse uniting and strengthening webs 13 13.

The upper part $f$ of the bolster, which for convenience of construction is formed in the two sections $f'$ and $f^2$, comprises, as to the section $f'$, the horizontal longitudinal member, having in its extremity the downwardly-opening cup-like sockets or spring-seats 16 16 and a central pending shell or hollow body 17, which has a fit in the vertical opening bounded by the cheek-pieces 14 14 and webs 13 13 of the base-casting $d$ of the bolster. The said section $f'$ is also provided with upwardly-opening cups or sockets 18 18, and the section $f^2$ of the upper part of the bolster embodies a base-plate 20, the downwardly-extending hollow bosses 22 22, which fit and are held in confinement in the sockets 18 18 by bolts or otherwise, and the rising member 23, which in its plan contour is curved and has the curved channel or slideway 24. The upper bolster member is supported from the base $d$ by the spiral springs $g$ $g$, the upper and lower ends of which are seated in the aforesaid sockets 22 22 and 18 18. When the separate sidewise-mounted bolsters are applied on the truck-frame, it is understood that the curved ways 24 in the upper spring-supported members are arranged as arcs of a common circle—that is to say, both of the curves or arcs have their course the same as if generated from the same point about centrally between the two axles and midway of the width of the truck. The car-body has at the end portion thereof which is over and supported by the truck castings or appliances $h$, which have sliding engagements with the said ways 24 in the tops of the bolsters. A good form or design for this fitting is indicated in Fig. 4, and is also seen in plan in Fig. 1 and in side elevation in Fig. 2, and consists of a plate adapted to be bolted to the under side of the sill or other appropriate part of the car-body by bolts, and it has the pending arc-formed rib 27, which is generated by the same radius as that of the way 24 in the top of each bolster. The rib has its curved length considerably greater than that of the bolster-top, so that there is no liability, on the considerable swinging or swiveling of the car-body upon or relative to the truck, of the sliding engagement between the car-body and bolster becoming discontinued.

In the particular construction of truck shown, especially by the plan view, Fig. 1, it may be ascertained that the point $x$ is the center of the swiveling motion of the car-body relative to the truck, and said point $x$ is in a vertical line about midway between the axles, which point, however, is understood as being in a place desired to be occupied by the electric motor; and while it is necessary that the connection which the truck has with the car-body (in addition to its supporting and sliding engagement at the bolsters) for constraining the body to have its swiveling movement relative to the truck about the said vertical axis, (indicated at $x$,) as aforesaid, the connection between the truck and car-body cannot be made consistent with the disposition of the motor, as aforesaid, directly at the point $x$, and hence resort is made to contrivances, as follows: Each side spring-supported bolster member $f$ has a link $j$, pivoted to its extremity, the link thence extending longitudinally inwardly for a suitable distance, and both links have their innermost ends united by a tie-beam $m$. This tie-beam $m$ is supported transversely of the truck and at right angles to the longitudinal line thereof and is beyond the swivel-point $x$, reckoning from the car-wheel axle nearest which the bolsters are mounted. The car-body is pivotally connected to the middle of the beam, as indicated at $y$. This connection may be advantageously made by means of the pending bracket $n$, which is secured to a cross-girder of the car-body, through which bracket and the beam the pivot-bolt vertically passes. Now it will be understood with respect to the action of these devices that as the car is rounding a curve and the car-body has relative to the truck the necessary swiveling movement the rib-castings $h$ have a sliding movement around in the channels or ways 24 of the bolsters and the body has its swinging movement, as it is of course only permitted to have, from the center $x$, from which the said arc-ways are generated. The point of pivotal connection which the car-body has at $y$ with the tie-beam $m$ at the time of the swiveling necessarily travels laterally in an arc line which is generated from the said swivel-point $x$, and this causes the tie-beam to have the compound of a movement bodily endwise as to itself, but laterally of the truck, and of a movement at right angles to its length and causes a corresponding deflection of the links $j j$, both thereof being always maintained in parallelism.

These constructions and operations last described, rendered necessary by reason of the reservation of the space comprising the center of swiveling movement for the motor, of course may be dispensed with where motors of a smaller size may be advantageously employed, and in Fig. 7 a plan of the truck is shown wherein the bolsters are united by a beam $m^2$, which may be rigidly connected thereto and which traverses the said center of swiveling movement, the point of connection between the truck and car-body being directly made at said point $x^2$, which point, as in the other modification of the truck already described at length, is concentrically within the arcways formed in the tops of both of the bolsters. The ultimate result, however, in both forms of the truck is the same, different forms of the means for constraining the parts for swiveling movement about the same given center becoming necessary, according as the constructer is or is not permitted to utilize the space comprising the swivel-center.

Having thus described our invention, what we claim, and desire to secure by Letters Patent, is—

1. In a railway-car, a truck having a car-body-supporting structure comprising a truck-frame embodying beam-united yokes arranged sidewise longitudinally of the truck and supported on the journals, bolsters which are spring-supported above the truck-frame at each side of the truck nearer the one pair of the wheels than the other and having curved ways, the car-body connected for a swiveling movement with a suitable part of the truck, and receiving supports at and by and having sliding engagements with said opposing bolsters, substantially as described.

2. In a railway-car, a truck having at each side thereof and nearer one pair of wheels than the other bolsters which at their upper portions have curved ways or bearing-surfaces generated from a common center, the car-body having its support upon said bolsters and a sliding engagement with said curved ways, and links connected to and extended longitudinally from said bolsters, and a beam pivotally connected to said links and extended from the one to the other transversely of the truck farther from the bolsters than the center from which said curved ways are generated, and the car-body pivotally connected upon said transverse beam, substantially as and for the purposes set forth.

3. In a railway-car, the combination, with a truck-frame having separate bolsters oppositely supported on side portions of said frame nearer one end pair of the car-wheels than the other and having the arc-formed channels in their tops, of the car-body having arc-formed ribs at lateral portions of its bottom for sliding engagements with said bolster arcways, substantially as described.

4. In a railway-car, the combination, with a truck-frame having mounted on opposite side members thereof the separate bolster-base castings, each comprising the upwardly-opening hollow body and spring-seats 12 12, of the upper bolster-sections, each having at its top the curved way 24 and provided with a pending body adapted for a vertical sliding engagement with the hollow body of said base-casting and having the spring-seats 16 16, the bolster-springs $g$, and the car-body having the pending arc-formed ribs 27, substantially as described.

5. In a railway-car, the combination, with a truck-frame comprising opposite longitudinal side beams, of the opposing bolster-bases $d\ d$, each comprising a bottom 10, the pending side flanges 11 11, the upwardly-open spring-seats 12 12 at the ends of the said bases and intermediate thereof the upwardly-open hollow body, the upper bolster-sections each comprising a member having in its top the curved way 24, the downwardly-opening spring-seats 16 16, and the pending body 17, the bolster-springs $g\ g$, and the car-body having at lateral portions of its bottom the castings $h$, each provided with the pending arc rib 27, and all arranged substantially as described.

6. In a railway-car, the combination, with the longitudinal side beams, of the truck-frame, the bolsters mounted thereon nearer one of the pair of wheels than the other, having the arc channels in their tops, the links $j$ $j$, connected to the bolsters, the transverse beam connected to the links, and the car-body having on its under side the bracket $n$, as shown, upon which the said transverse beam is intermediately thereof pivotally connected, and the said body having the pending ribs 27 27, substantially as described.

GEO. M. HOADLEY.
SUMNER A. BEMIS.

Witnesses:
WM. S. BELLOWS,
H. A. CHAPIN.